(12) United States Patent
Chasman et al.

(10) Patent No.: US 7,856,806 B1
(45) Date of Patent: Dec. 28, 2010

(54) PROPULSION SYSTEM WITH CANTED MULTINOZZLE GRID

(75) Inventors: Daniel Chasman, Tucson, AZ (US); Stephen D. Haight, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1053 days.

(21) Appl. No.: 11/593,440

(22) Filed: Nov. 6, 2006

(51) Int. Cl.
*F02K 9/00* (2006.01)

(52) U.S. Cl. .............................. 60/258; 60/222; 60/229; 239/265.11

(58) Field of Classification Search .................. 60/258, 60/222, 229; 239/265.11
See application file for complete search history.

(56) References Cited

U.S. PATENT DOCUMENTS

| | | | |
|---|---|---|---|
| 2,613,497 A | 10/1952 | Macdonald | |
| 2,933,889 A | 4/1960 | Tolkmitt | |
| 2,968,245 A | 1/1961 | Sutton et al. | |
| 3,046,736 A | 7/1962 | Thomsom | |
| 3,052,090 A | 9/1962 | Herzog | |
| 3,097,482 A | 7/1963 | Lovingham | |
| 3,115,747 A | 12/1963 | Yu | |
| 3,147,591 A | 9/1964 | McEwen | |
| 3,383,861 A * | 5/1968 | Bell, Jr. .................... | 60/229 |
| 3,420,060 A | 1/1969 | Toney et al. | |
| 3,433,265 A | 3/1969 | Emil | |
| 3,650,348 A | 3/1972 | Colebrook et al. | |
| 3,817,029 A | 6/1974 | Frisch | |
| 4,023,749 A | 5/1977 | McCorkle | |
| 4,085,909 A | 4/1978 | East et al. | |
| 4,131,246 A | 12/1978 | Rotmans | |
| 4,163,534 A | 8/1979 | Seeger | |
| 4,432,512 A | 2/1984 | Young | |
| 4,482,107 A | 11/1984 | Metz | |
| 4,483,139 A | 11/1984 | Engl | |
| H236 H * | 3/1987 | Maykut ..................... | 244/3.22 |
| 4,745,861 A | 5/1988 | Fenton et al. | |
| 4,826,104 A | 5/1989 | Bennett et al. | |

(Continued)

FOREIGN PATENT DOCUMENTS

DE 1 170 284 10/1960

(Continued)

OTHER PUBLICATIONS

Saturn V Flight Manual AS 506, no date, no author; posted on the Internet at www.apollosaturn.com; section entitled "S-IC Stage."

(Continued)

*Primary Examiner*—Michael Cuff
*Assistant Examiner*—Craig Kim
(74) *Attorney, Agent, or Firm*—Renner, Otto, Boisselle & Sklar, LLP

(57) ABSTRACT

A propulsion system includes a canted multinozzle plate, which has a multitude of small nozzles angled (not perpendicular) to major surfaces of the multinozzle grid plate. The multinozzle plate may be a cylindrical section or plate, and the multitude of nozzles may be substantially axisymmetric about the cylindrical plate. The propulsion system includes a pressurized gas source which may be placed either forward or aft of the multinozzle grid plate. The propulsion system may have a conical insert, an internal flow separator cone, to aid in changing directions of flow from the pressurized gas source, to divert the flow through the multiple nozzles.

18 Claims, 4 Drawing Sheets

U.S. PATENT DOCUMENTS

| | | |
|---|---|---|
| 4,844,380 A | 7/1989 | Peoples et al. |
| 4,867,393 A | 9/1989 | Faupell et al. |
| 4,913,379 A | 4/1990 | Kubota et al. |
| 5,074,492 A | 12/1991 | Morgand |
| 5,112,007 A | 5/1992 | Buchele-Buecher |
| 5,158,246 A | 10/1992 | Anderson, Jr. |
| 5,343,698 A | 9/1994 | Porter et al. |
| 5,456,425 A | 10/1995 | Morris et al. |
| 5,505,408 A | 4/1996 | Speicher et al. |
| 5,511,745 A | 4/1996 | Faupell et al. |
| 5,662,290 A | 9/1997 | Voigt |
| 5,887,821 A | 3/1999 | Voigt et al. |
| 6,142,425 A | 11/2000 | Armanios et al. |
| 6,185,927 B1 * | 2/2001 | Chrones et al. ............... 60/258 |
| 6,322,610 B1 * | 11/2001 | Pavlicevic et al. ............ 75/554 |
| 7,108,223 B2 | 9/2006 | Chasman et al. |
| 2004/0084566 A1 | 5/2004 | Chasman |
| 2005/0011989 A1 | 1/2005 | Chasman et al. |
| 2006/0284006 A1 | 12/2006 | Chasman et al. |

FOREIGN PATENT DOCUMENTS

| | | |
|---|---|---|
| DE | 1 153 657 | 8/1963 |
| DE | 8320443 | 5/1985 |
| DE | 37 14 425 | 11/1988 |
| FR | 1 217 708 | 5/1960 |
| GB | 2 092 271 | 8/1982 |
| JP | 08094298 | 4/1996 |
| WO | WO 2004/044519 | 5/2004 |
| WO | 2004099601 | 11/2004 |

OTHER PUBLICATIONS

D. Chasman, "Characteristic Gap: A New Design Criterion for Solid Rocket . . ." Technical Note, Journal of Propulsion, vol. 17, No. 1, pp. 216-218, Washington DC, Mar. 2000.

United States Statutory Invention Registration, Reg. No. H236, Published: Mar. 3, 1987, Maykut.

International Search Report and Written Opinion from corresponding International Application No. PCT/US07/83448.

* cited by examiner

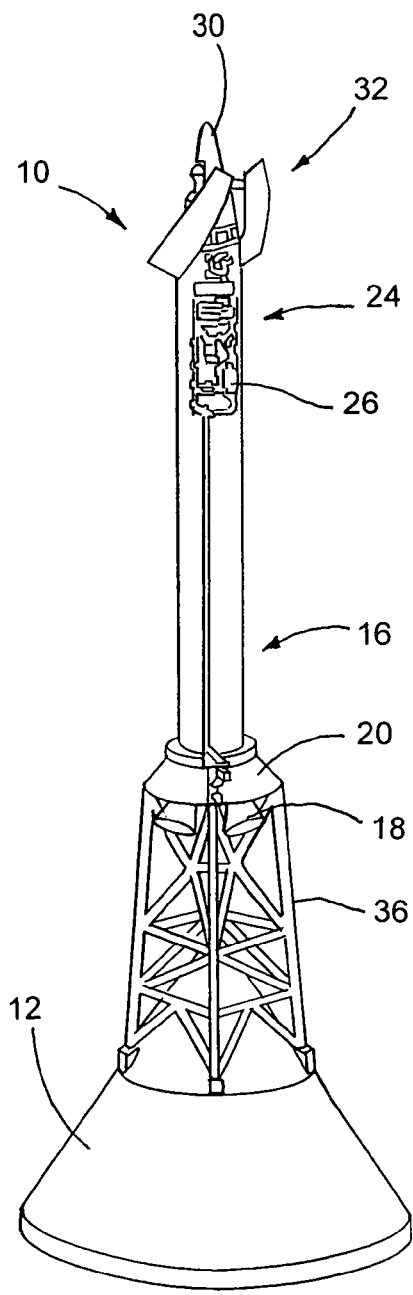
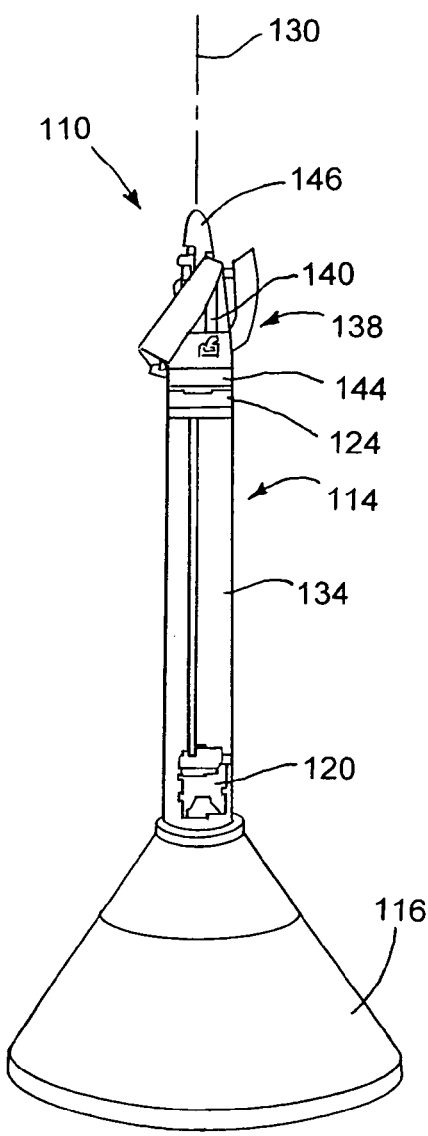
FIG. 1
PRIOR ART
FIG. 2

# PROPULSION SYSTEM WITH CANTED MULTINOZZLE GRID

BACKGROUND OF THE INVENTION

1. Field of the Invention

This invention is in the field of propulsion systems, such as rocket motor propulsion systems.

2. Description of the Related Art

There are launch systems, missiles, rockets, and projectiles that require a propulsion unit that either mounts in front of other units, or straps to a main propulsion unit to be separated after use. An example of the first type is an escape module for a booster rocket, such as the launch escape assembly for the Apollo Saturn V rocket. Another example of the first type is in wire-guided missiles, where a missile motor is located in front of a spool of fiber optic wire. An example of the second type of motors is used in ejection seats of aircraft.

In such systems output from a standard rocket motor nozzle cannot be directed straight rearward, since to do so would cause a plume of very hot exhaust gases to contact other structures. To remedy this problem nozzles in such prior art propulsion systems have been canted. That is, the nozzles have been angled away from a centerline of the vehicle.

FIG. 1 shows a prior art launch escape assembly 10 used for separating a crew module 12 from a main rocket (not shown) in the event of a malfunction during launch or early in the flight procedure. The launch escape assembly shows two types of canted nozzle arrangements used in prior systems. A main launch escape motor 16 has a set of canted nozzles 18 at its aft end. The launch escape motor canted nozzles 18 are located behind an aerodynamic skirt 20, and protrude beyond the diameter of the cylindrical launch escape motor 16. The launch escape assembly 10 also has a tower jettison motor 24 that has canted nozzles 26 that are substantially flush with an outer surface of the main cylindrical part of the launch escape assembly 10. The tower jettison motor 24 is located toward a forward end of the launch escape assembly 10, near a nosecone 30 and a canard assembly 32.

The launch escape assembly 10 also includes a launch escape tower 36, used to maintain separation between the launch escape motor canted nozzles 18 and the crew module 12. Although the launch escape motor canted nozzles 18 are angled somewhat away from the centerline of the launch escape assembly 10, some additional separation is required to avoid undesirable heating of the crew module 12.

The two types of canted nozzles 18 and 26 illustrate some of the shortcomings of prior art propulsion systems that are placed forward relative to other components. The launch escape motor canted nozzles 18 require a diameter greater than that of the main cylindrical portion of the launch escape assembly 10. And despite being angled away from the centerline of the launch escape assembly 10, an additional structure (the launch escape tower 36) is still necessary to provide separation from the crew module 12. The launch escape tower 36 adds additional cost and weight, and increases the overall size of the launch escape assembly 10.

Although the tower jettison motor canted nozzles 26 are substantially flush with the outer cylindrical surface of the main portion of the launch escape assembly 10, this feature is achieved at a performance cost. Truncating the canted nozzles 26 reduces overall performance when compared to converge-diverge nozzles that do not have truncated shapes.

From the foregoing it is seen that there is room for improvement with regard to propulsion systems of this type.

SUMMARY OF THE INVENTION

In accordance with an aspect of the invention, a multinozzle grid plate has a multitude of canted nozzles. The multinozzle grid plate may have a cylindrical shape.

In accordance with another aspect of the invention, a portion of a rocket structure has a multitude of canted nozzles substantially flush with a cylindrical rocket wall. The nozzles are convergent-divergent nozzles with convergent and divergent portions defined by shapes within the thickness of the rocket wall.

In accordance with yet another aspect of the invention, a propulsion system includes: a pressurized gas source; and a multinozzle grid plate operatively coupled to the pressurized gas source. The multinozzle grid plate has plural convergent-divergent nozzles therein that are canted nozzles, angled relative to major surfaces of the multinozzle grid plate.

In accordance with still another aspect of the invention, a propulsion system includes: a pressurized gas source; a multinozzle grid plate operatively coupled to the pressurized gas source, wherein the multinozzle grid plate is substantially cylindrical; and a flow separator cone within the multinozzle grid plate. The multinozzle grid plate has plural convergent-divergent nozzles therein that are canted nozzles, angled relative to major surfaces of the multinozzle grid plate. The flow separator cone turns flow from the pressurized gas source toward the nozzles. The nozzles are substantially axisymmetrically located about the multinozzle grid plate. The nozzles are substantially flush with an outer major surface of the multinozzle grid plate. The nozzle plate includes at least n canted nozzles, with $n=(l_{ESN}/t_{plate})^2$ or $n=(d_{ESN}/d_{plate})^2$, where $l_{ESN}$ is the length and $d_{ESN}$ is the throat diameter of an Equivalent Single Nozzle (ESN), while $t_{plate}$ is the thickness of the MNG plate obtained from stress analysis of MNG plate made from selected material. The $d_{plate}$ is the throat diameter of a scaled single nozzlette in the MNG. ESN is a single nozzle having the same convergent and divergent angles as well as throat area and exit area as that of a MNG with n nozzlettes. For example, nozzlette area population efficiency study showed that 85 nozzlettes MNG on a disk has 82.2% population efficiency.

According to a further aspect of the invention, a method of propelling a rocket vehicle includes: providing a propulsion system that includes a pressurized gas source, and a cylindrical multinozzle grid plate having at least n convergent-divergent nozzles, wherein the nozzles are canted relative to major surfaces of the multinozzle grid plate, and directing gas from the pressurized gas source through the convergent-divergent nozzles, thereby providing thrust for the rocket vehicle.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 1 is an isometric, partial cutaway detail of a prior art launch escape assembly;

FIG. 2 is an isometric, partial cutaway detail of a launch escape system that utilizes a propulsion system in accordance with an embodiment of the present invention;

DETAILED DESCRIPTION

Figure 3:
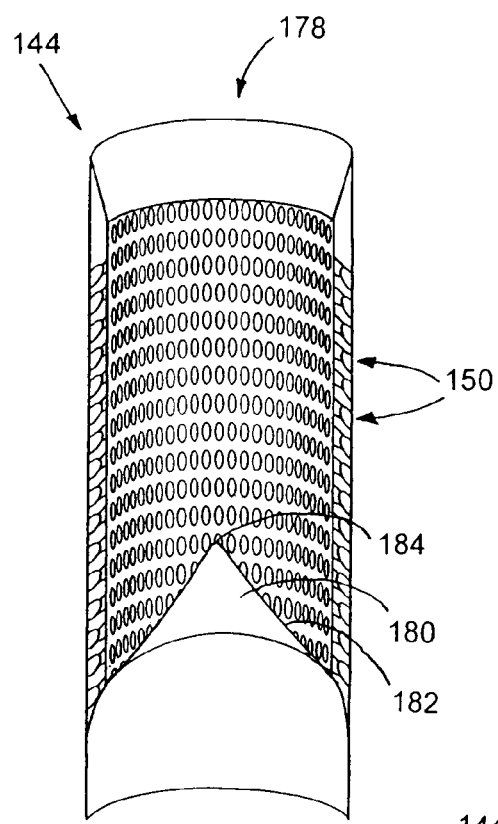
FIG. 3 is a cutaway view of a first embodiment of a multinozzle grid for use with the propulsion system of FIG. 2.

A propulsion system includes a canted multinozzle plate, which has a multitude of small nozzles angled (not perpendicular) to major surfaces of the multinozzle grid plate. The multinozzle plate may be a cylindrical section or plate, and the multitude of nozzles may be substantially axisymmetric about the cylindrical plate. The multitude of nozzles may be canted at any of a wide variety of angles relative to the longitudinal axis of the cylindrical multinozzle grid plate, such as angles from 30 degrees to 150 degrees. The propulsion system includes a pressurized gas source which may be placed either forward or aft of the multinozzle grid plate. When the pressurized gas source is placed aft of the multinozzle grid plate, flow turning may be required to get the pressurized gas to pass through the multiple nozzles and provide forward thrust. The propulsion system may have a conical insert, an internal flow separator cone, to aid in changing directions of flow from the pressurized gas source, to divert the flow through the multiple nozzles. The conical member may aid in performance and reduced stagnation losses. Due to the nozzlettes scaling, the propulsion system advantageously fits within a cylindrical vehicle body, without any need to truncate the nozzles in a way that adversely affects performance. The multinozzle grid plate may be configured to obtain performance comparable to that of conventional multiple separate nozzles. Other advantages of the propulsion system include reduction of weight, ease of manufacture, reduction of overall vehicle size, and flexibility in placement of nozzles and pressurized gas sources.

FIG. 2 shows a launch escape system 110, one example of an application of a propulsion system 112 that utilizes a multinozzle grid plate. The propulsion system 112 includes a launch escape motor 114 for separating a crew module 116 from a main booster rocket (not shown). The launch escape motor 114 includes a launch escape motor propellant or pressurized gas source 120 that is aft of a launch escape motor multinozzle grid plate 124 having multiple nozzles (also referred to herein as nozzlettes). The term "nozzle" as used herein refers to convergent-divergent nozzles, with convergent portions, throats, and divergent portions. As described in greater detail below, the launch escape motor propellant or pressurized gas source 120 creates pressurized gas which moves forward within the launch escape system 110, and then is turned and ejected through the launch escape motor multinozzle grid plate 124. The launch escape motor propellant or pressurized gas source 120 may be any of a variety of suitable sources or pressurized gas. A solid rocket fuel is an example of a suitable propellant for use in the launch escape motor propellant or pressurized gas source 120.

It will be appreciated that a significant amount of turning of the flow from the launch escape motor propellant or pressurized gas source 120 is necessary to expel the flow through the nozzles of the launch escape motor multinozzle grid plate 124. In order to provide propulsion to the launch escape system 110 the pressurized gas exiting the launch escape multinozzle grid plate 124 must be expelled in a generally rearward direction. Since the launch escape motor propellant or pressurized gas source 120 is aft of the launch escape motor multinozzle grid plate 124, pressurized gas from the source 120 moves in a generally longitudinally-forward direction toward the multinozzle grid plate 124. This movement may be substantially parallel to a central axis 130 of the launch escape system 110. The gas flow must be turned greater than 180 degrees in order to exit in a generally rearward direction through the nozzles of the multinozzle grid plate 124, but angled away from a cylindrical housing 134 of the launch escape system 110. The nozzles of the multinozzle grid plate 124 may be angled about 30 degrees away from a straight rearward direction. This means that the flow turning from the generally longitudinal forward direction to the exit through the multinozzle grid plate 124 requires a turning of about 150 degrees.

The propulsion system 112 also includes a tower jettison motor 138 for separating the cylindrical housing 134 from the crew module 116. The tower jettison motor 138 includes a tower jettison motor propellant or pressurized gas source 140 and a tower jettison motor multinozzle grid plate 144. The tower jettison motor propellant or pressurized gas 140 is forward of the tower jettison motor multinozzle grid plate 144. In other words the propellant 140 is closer to a nosecone 146 than is the multinozzle grid plate 144. Thus pressurized gas from the tower jettison motor propellant or pressurized gas source 140 flows backward through the housing 134 to the multinozzle grid plate 144. Therefore less turning is required to divert the flow out through the nozzles of the multinozzle grid plate 144. Nozzles of the multinozzle grid plate 144 may be angled outward at about 30 degrees relative to the direction of the axis 130.

Figure 4:
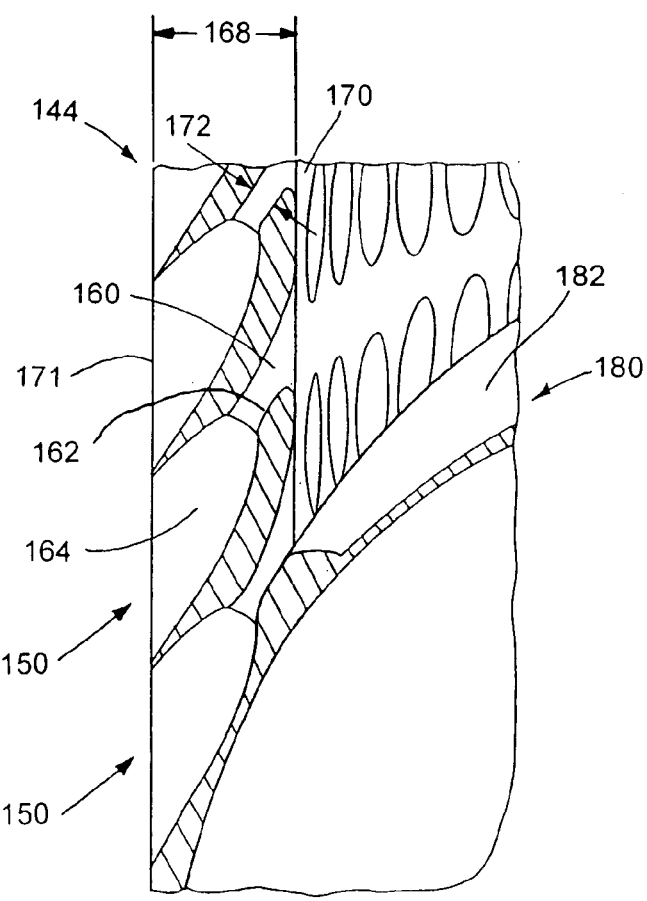
FIG. 4 is a detailed view of a portion of the multinozzle grid plate of FIG. 3.

FIGS. 3 and 4 show further details of the tower jettison motor multinozzle grid plate 144. The multinozzle grid plate 144 includes a multitude of nozzles 150. Nozzles 150 are arranged in a series of rows 152 that are axially separated from each other at different axial (longitudinal) distances along the axis 130. The nozzles 150 in each of the rows 152 may be located substantially axisymmetrically about the circumference of the multinozzle grid plate 144. That is, the nozzles 150 in each of the rows 152 may be evenly circumferentially spaced about the axis 130. The rows 152 may be configured such that the nozzles 150 are arrayed in a series of axially-aligned columns 154. That is, the nozzles 150 in one of the rows 152 may be located at circumferential locations immediately above and below the nozzles of adjacent rows.

The nozzles 150 are converge-diverge nozzles, each having a converge portion 160, a throat 162, and a diverge portion 164. A thickness 168 of the multinozzle grid plate 144, between major surfaces 170 and 171 of the grid plate 144, is large relative to a throat diameter 172 of the nozzles 150. Since the scaling of the equivalent single nozzle (ESN) allows the multinozzle grid (MNG) nozzles 150 to be scaled to a thickness smaller than 168, extension of the nozzle shapes to make them flush with the outer surface 171 results in an increase in nozzle performance. Thus the nozzles 150 may be made flush with an outer surface 171 of the multinozzle grid plate 144 while still maintaining a high expansion ratio. This is in contrast to larger prior art flush nozzles, which must be substantially truncated in order to make them flush. In addition, the convergent portions 160 for the nozzles 150 are substantially axisymmetric. This is desirable for obtaining maximal flow entrainment, and for flexibility in orienting the multinozzle grid plate 144.

The multinozzle grid plate 144 has an open end 178 for receiving pressurized gases from a suitable propellant or pressurized gas source 140 (FIG. 2). At an opposite end the multinozzle grid plate includes a flow separator cone 180. The flow separator cone 180 has an axisymmetric shape that is configured to aid in desirably redirecting the flow of gases toward the convergent portions 160 of the nozzles 150. The flow separator cone 180 has a curved axisymmetric surface 182 that culminates in a central point 184. The curved surface 182 is configured to turn incoming flow to the direction of entry into the convergent portions 160 of the nozzles 150. The flow separator cone 180 aids in reducing stagnation in the pressurized gas flow, and also in reducing heat losses. The flow separator cone 180 is made of a thermally insulating material, such as a short-strand glass-reinforced phenolic or the like.

The multinozzle grid plate 144 may be made of any of a variety of suitable materials. The grid plate material must be compatible with the propellant used. Aluminized propellants are compatible with refractory materials of a metallic nature. Such materials have high densities, however, and therefore are sometimes utilized as a thin surface layer, on the order of 25 microns thick. The bulk of the structural material may be a suitable composite material or a suitable ceramic matrix material.

Figure 5:
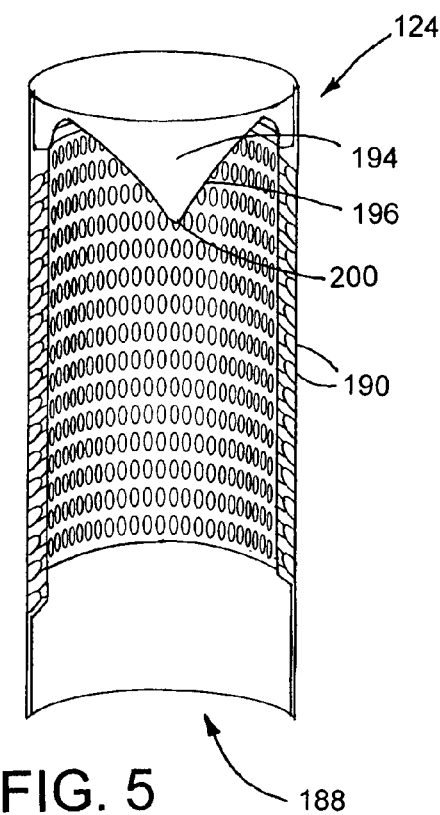
FIG. 5 is a cutaway view of a second embodiment of a multinozzle grid for use with the propulsion system of FIG. 2.
Figure 6:
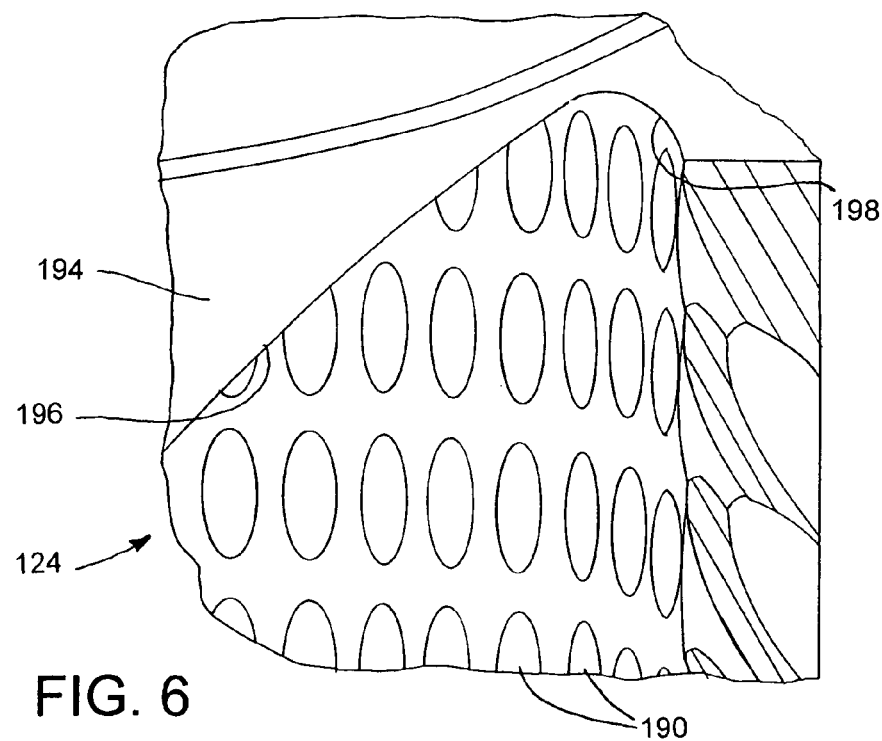
FIG. 6 is a detailed view of a portion of the multinozzle grid plate of FIG. 5.

Turning now to FIGS. 5 and 6, the launch escape motor multinozzle grid plate 124 may be similar in configuration to that of the multinozzle grid plate 144. The nozzles of the two multinozzle grid plates 124 and 144 may be the same as regards configuration and orientation. A difference is that an open end 188 for the multinozzle grid plate 124 is at the bottom of the multinozzle grid plate 124. This is opposite in direction, relative to the cant of the nozzles, from the configuration of the multinozzle grid plate 144. Thus more flow turning is required to get flow flowing through the open end 188 into the nozzles 190 of the multinozzle grid plate 124. A flow separator cone 194 therefore has a different shape than the flow separator cone 180 (FIG. 3). The flow separator cone 194 is made of a thermally insulating material, and has a curved surface 196 configured to move the flow seamlessly into convergent portions of the nozzles 190. The curved surface 196 may have a downward-directed outer surface 198 directing the flow downward in a direction the same as the direction of a central point 200 of the flow separator cone 194.

The multinozzle grid plate may have a great number of nozzles, such as at least 100 nozzles, or dozens or hundreds of nozzles. It will be appreciated that a wide variation in the number of nozzles is possible. The nozzles of the multinozzle grid plate may all be canted to substantially the same angle, and may have substantially identical shapes. However, it will be appreciated that variations in nozzle shape and/or angular orientation are possible.

Although the propulsion description has been described above with regard to a launch escape system, it will be appreciated that the propulsion system described above may be utilized in a wide variety of rockets, missiles, and other projectiles. Some other uses of multinozzle grids are described in U.S. patent application Ser. No. 10/288,943, filed Nov. 6, 2002, in U.S. patent application Ser. No. 10/289,651, filed Nov. 7, 2002, and in U.S. patent application Ser. No. 11/113,511, filed Apr. 25, 2005, the descriptions and figures of all of which are incorporated herein by reference.

Figure 7:
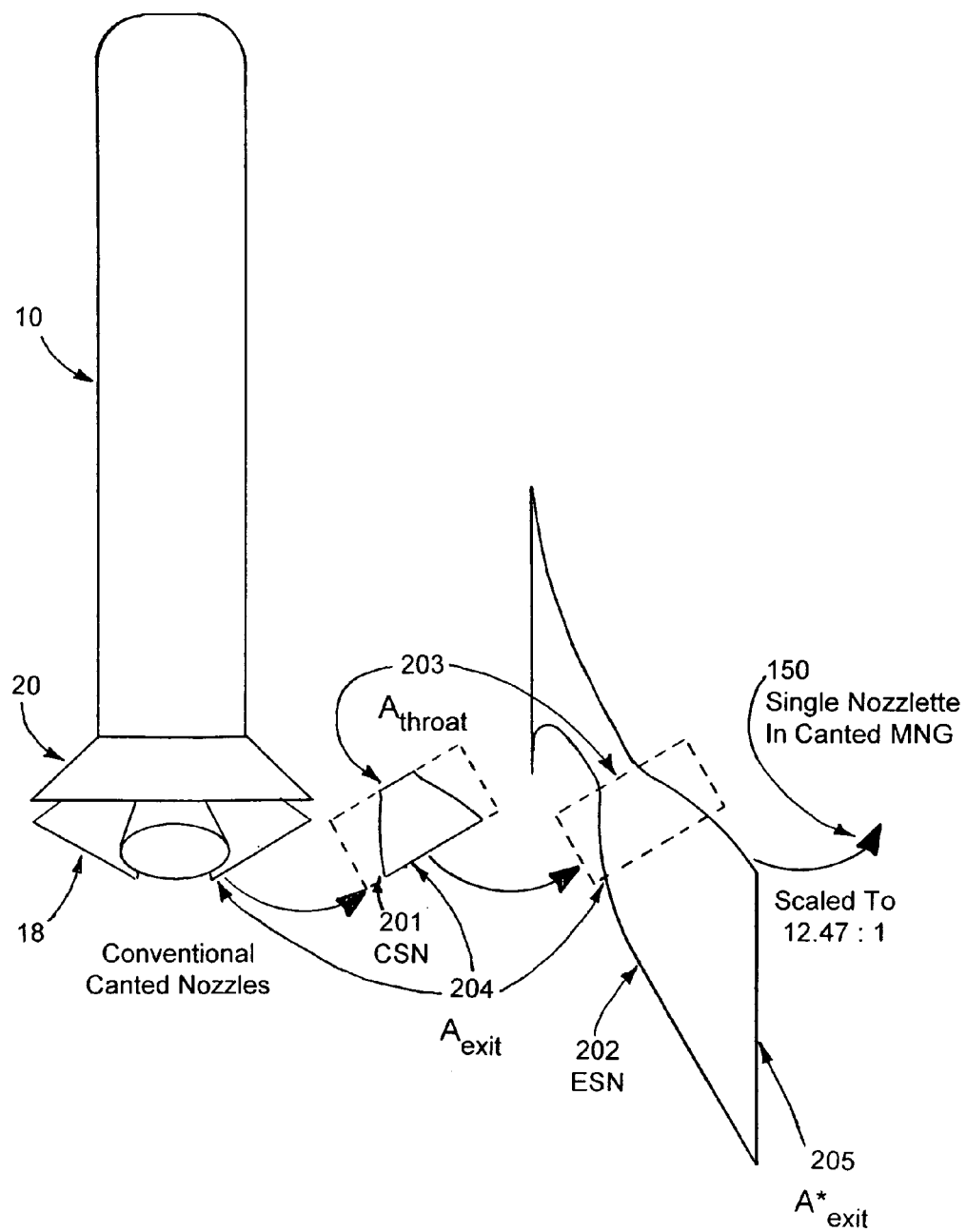
FIG. 7 is an illustration showing aspects of a process for configuring a multinozzle grid in accordance with an embodiment of the invention.

FIG. 7 illustrates an example of multinozzle grid plate configuring. The prior art launch escape assembly 10 in FIG. 7 has four canted nozzles 18 protected by an aerodynamic skirt 20. A canted conventional single nozzle 201 having the same throat area 203 and exit area 204 is shown separately as one out of the four canted nozzles 18. A dash-line box 211 bounds the canted conventional single nozzle 201 geometry. The canted equivalent single nozzle 202 shows the same box 212 to define the range of the canted conventional single nozzle 201 within its geometry demonstrating the higher extent of its exit area 205 compared with the prior art exit area 204. Note that in all cases (i.e., 10, 201, 202 and 150) the nozzle area 203 is preserved. Recalling the formula given above, $n=(l_{ESN}/t_{plate})^2$ or $n=(d_{ESN}/d_{plate})^2$, where n is the number of nozzles (nozzlettes), $l_{ESN}$ is the length, $d_{ESN}$ is the throat diameter of an Equivalent Single Nozzle (ESN), $t_{plate}$ is the thickness of the MNG plate obtained from stress analysis of MNG plate made from selected material, and $d_{plate}$ is the throat diameter of a scaled single nozzlette in the MNG Based on this formula, the canted equivalent single nozzle 202 is scaled down at a ratio of 12.247:1 to a single nozzlette 150. Accordingly, for a canted conventional single nozzle 201 throat area of 0.575 in$^2$, and n=150 nozzlettes in the canted MNG, each nozzlette 150 throat area is 0.0038374 in$^2$. So the canted equivalent single nozzle 202 throat area is maintained at 0.575 in$^2$ based on the ratio: $nA_{Nozzlette}=A_{ESN}$ or (150) (0.0038374 in$^2$)=0.575 in$^2$. The canted multinozzle grid achieves a much higher expansion ratio than conventional canted nozzles, and consequently also achieves a higher thrust than conventional systems.

It will be appreciated that the propulsion system 112, and variants of such a propulsion system, offer a wide variety of advantages relative to systems utilized previously. One advantage is that the multinozzle grid plates are able to accommodate scaled-down versions of full size conventional canted nozzles that without truncation would occupy diameters larger than that of the missile, rocket, or other vehicle. The scaled-down versions have a smaller length and diameter, for instance allowing them to be flush with a missile or vehicle body, without the need to truncate the nozzles to the extent that performance would be substantially reduced.

The multinozzle grid plate also advantageously utilizes the housing of the rocket, missile, or other vehicle for the nozzles themselves. In other words, the cylindrical walls function both as structural units for the missile and as the nozzles. This results in smaller structural mass fraction and facilitates manufacturing, in contrast with the traditional separate structures for the missile body and for the nozzles.

The substantially axisymmetric shape of the convergent portion of the nozzles reduces stagnation losses in the nozzles of the multinozzle grid. Also, the same multinozzle grid may be utilized for both forward propellant (propellant forward of the multinozzle grid plate), and aft propellant (propellant aft of the multinozzle grid plate) configuration. This results in a further reduction in manufacturing costs, and increases versatility in configuring rockets or other vehicles.

The multinozzle grid plate provides the further advantage of allowing the outlet from a main motor to be moved well away from the aft end of the motor. This allows the main motor output gases to be moved well away from any following structure, such as a crew module or other portion of a rocket vehicle. This may reduce overall size of the vehicle, and may also advantageously reduce the amount of protection that would otherwise be needed to shield the following structure from hot gases.

In configuring the nozzles 150 and 190 of the multinozzle grid 124 and 144, one may be begin with a potential single nozzle that embodies the best internal ballistic potential that can be provided, without regard to added mass. A scaling down of the potential single nozzle may be performed, scaling down the nozzle shape to fit in with the present or desired wall thickness of the rocket. A desired thrust output may dictate the number of nozzles that will be required for the multinozzle grid plate. Material strength considerations and other material properties may be used to determine a desired spacing of the nozzles.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A propulsion system comprising:
   a pressurized gas source; and
   a multinozzle grid plate operatively coupled to the pressurized gas source, wherein the multinozzle grid plate is substantially cylindrical, having major surfaces;
   wherein the multinozzle grid plate has plural convergent-divergent nozzles therein that are canted nozzles, angled relative to the major surfaces of the multinozzle grid plate;
   wherein the nozzles are in multiple rows longitudinally spaced along the multinozzle grid plate; and
   wherein pressurized gas from the pressurized gas source is ejected from the nozzles of the multinozzle grid plate.

2. The propulsion system of claim 1, wherein the propulsion system is part of a rocket vehicle.

3. The propulsion system of claim 2, wherein the multinozzle grid plate is located in the rocket vehicle aft of the pressurized gas source.

4. The propulsion system of claim 2, wherein the multinozzle grid plate is located in the rocket vehicle forward of the pressurized gas source.

5. The propulsion system of claim 1, further comprising a flow separator cone within the multinozzle grid plate.

6. The propulsion system of claim 5, wherein the flow separator cone turns flow from the pressurized gas source toward the nozzles.

7. The propulsion system of claim 6, wherein the flow separator cone has a curved surface that turns the flow.

8. The propulsion system of claim 6, wherein a surface of the flow separator cone has an outer edge that is directed in substantially along a direction of the nozzles.

9. The propulsion system of claim 1, wherein the nozzles are substantially axisymmetrically located about the multinozzle grid plate.

10. The propulsion system of claim 1, wherein the nozzles of the multiple rows are axially aligned with one another.

11. The propulsion system of claim 1, wherein the nozzles are substantially flush with an outer major surface of the multinozzle grid plate.

12. The propulsion system of claim 11, wherein the nozzles perform substantially as untruncated nozzles.

13. The propulsion system of claim 2, wherein the cylindrical multinozzle grid plate is a structural member of the rocket vehicle.

14. The propulsion system of claim 1, wherein convergent sections of the nozzles are substantially axisymmetric.

15. The propulsion system of claim 1, wherein the nozzle plate includes at least 100 canted nozzles.

16. A propulsion system comprising:
   a pressurized gas source;
   a multinozzle grid plate operatively coupled to the pressurized gas source, wherein the multinozzle grid plate is substantially cylindrical; and
   a flow separator cone within the multinozzle grid plate;
   wherein the multinozzle grid plate has plural convergent-divergent nozzles therein that are canted nozzles, angled relative to major surfaces of the multinozzle grid plate;
   wherein the flow separator cone turns flow from the pressurized gas source toward the nozzles;
   wherein the nozzles are substantially axisymmetrically located about the multinozzle grid plate;
   wherein the nozzles are substantially flush with an outer major surface of the multinozzle grid plate; and
   wherein the nozzle plate includes at least 100 canted nozzles.

17. A method of propelling a rocket vehicle, the method comprising:
   providing a propulsion system that includes a pressurized gas source, and a cylindrical multinozzle grid plate having at least 100 convergent-divergent nozzles, wherein the nozzles are canted relative to major surfaces of the multinozzle grid plate, and
   directing gas from the pressurized gas source through the convergent-divergent nozzles, thereby providing thrust for the rocket vehicle.

18. The method of claim 17, wherein the directing includes turning flow from the pressurized gas source using a flow separator cone of the propulsion system that is within the multinozzle grid plate.

* * * * *